Oct. 13, 1959
E. NELSON
2,908,526
MECHANICAL HAY FORK
Filed June 4, 1954
2 Sheets-Sheet 1
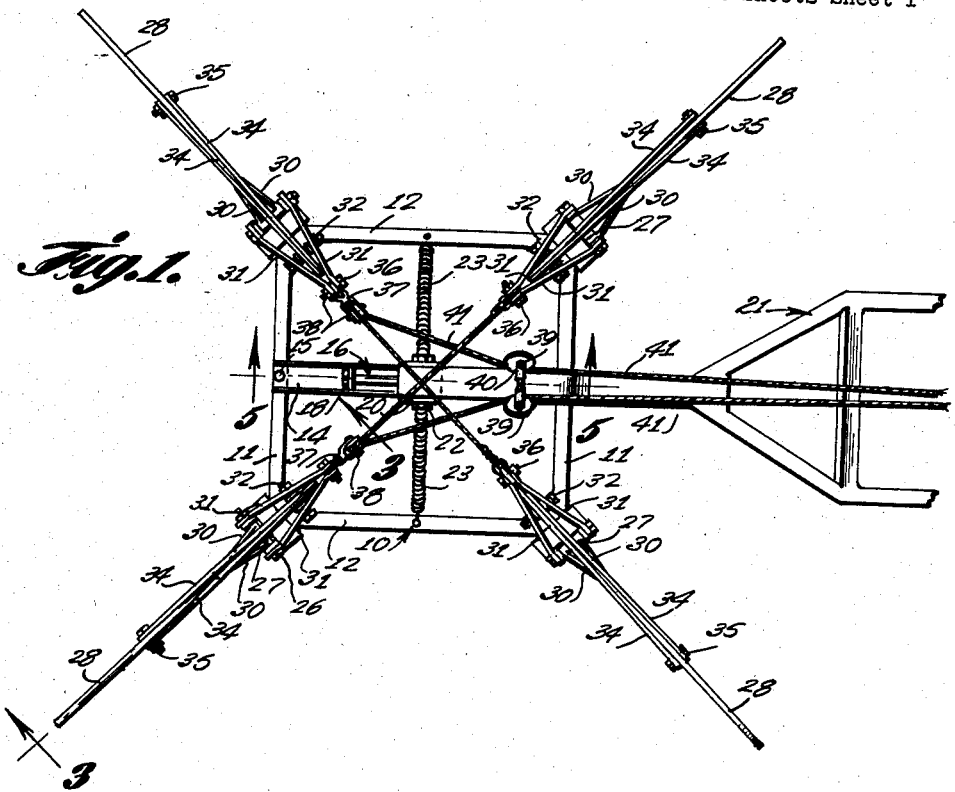
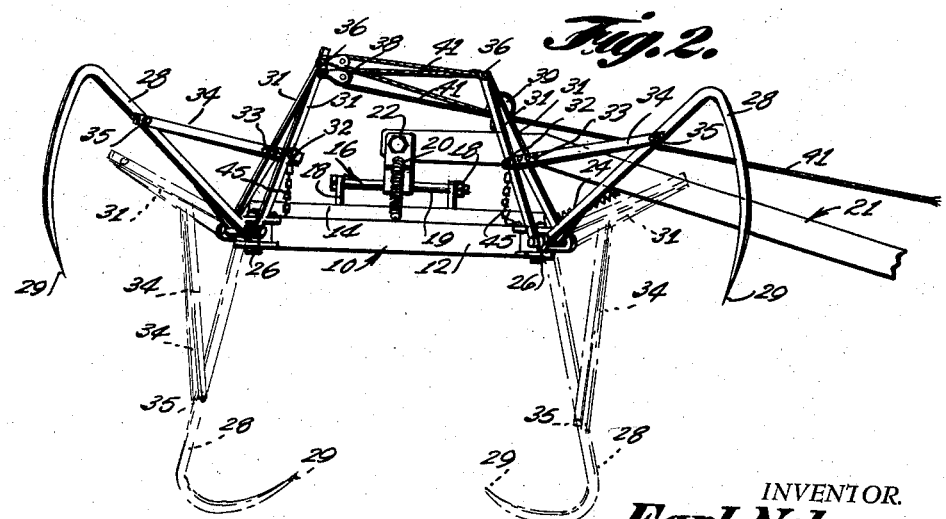
INVENTOR.
*Earl Nelson*
BY *Victor J. Evans & Co.*
ATTORNEYS Oct. 13, 1959  E. NELSON  2,908,526
MECHANICAL HAY FORK
Filed June 4, 1954  2 Sheets-Sheet 2
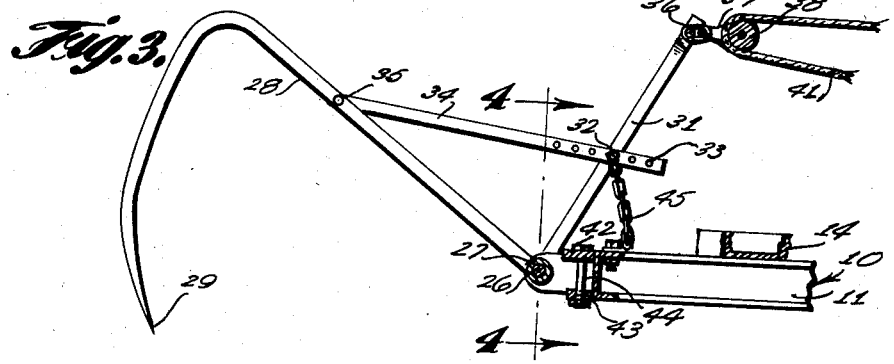
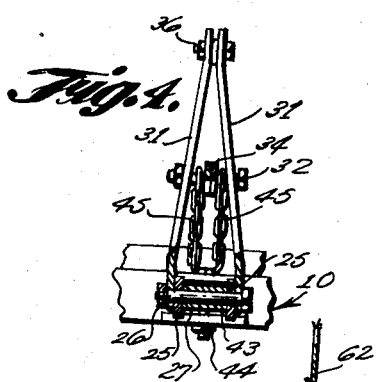
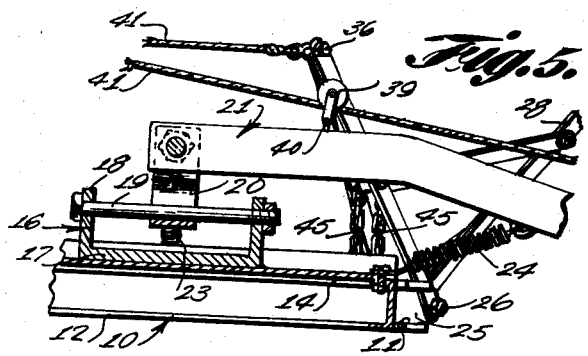
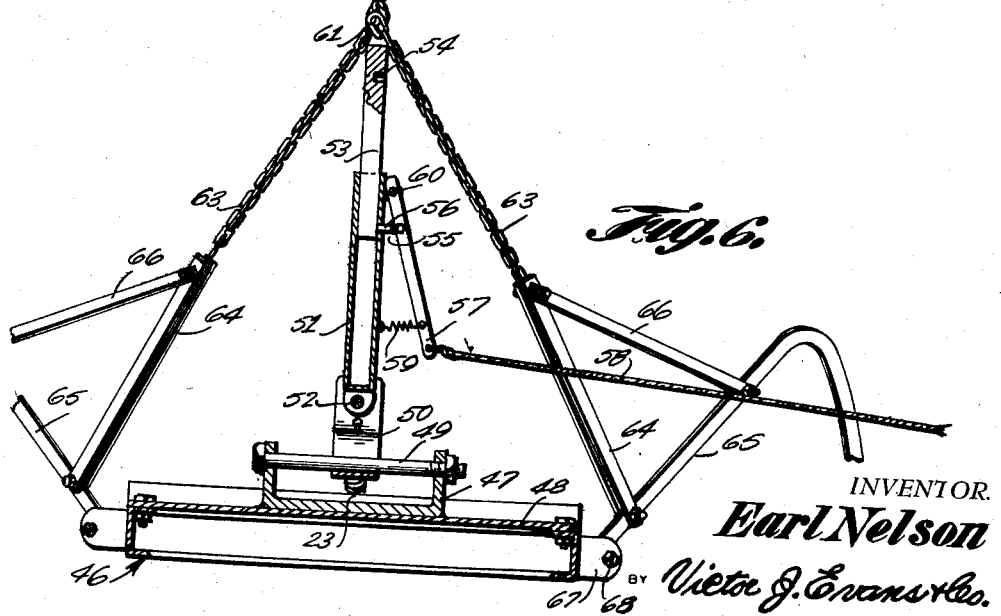
INVENTOR.
Earl Nelson
BY Victor J. Evans & Co.
ATTORNEYS – # United States Patent Office 2,908,526
Patented Oct. 13, 1959

2,908,526

MECHANICAL HAY FORK

Earl Nelson, Velva, N. Dak.

Application June 4, 1954, Serial No. 434,437

4 Claims. (Cl. 294—107)

This invention relates to a material handling device, and more particularly to a fork for lifting or handling material such as hay.

The object of the invention is to provide a hay fork or lift which is adapted to be mounted on a tractor or the like whereby hay or other material can be conveniently picked up from one location and deposited in a different location.

Another object of the invention is to provide a hay lift which is adapted to be actuated by cables or ropes that are trained over pulleys, the cables being arranged so that they will not rub against each other to cause undue wear, the device of the present invention adapted to be readily unloaded by a simple manual movement of the actuating mechanism.

A further object of the invention is to provide a mechanical hay fork which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a fragmentary top plan view of the mechanical hay fork, constructed according to the present invention.

Figure 2 is a side elevational view of the hay fork.

Figure 3 is a sectional view taken on the line 3—3 of Figure 1.

Figure 4 is a sectional view taken on the line 4—4 of Figure 3.

Figure 5 is a sectional view taken on the line 5—5 of Figure 1.

Figure 6 is a sectional view taken through a modified hay fork.

Referring in detail to the drawings, the numeral 10 designates a rectangular frame that can be made of any suitable material such as suitable metal stock, and the frame 10 includes spaced parallel end pieces 11 and spaced parallel side members 12, Figure 1. Extending between the end pieces 11 and secured thereto in any suitable manner, as for example by means of the bolt and nut assemblies 15, is a beam 14. Secured to the upper surface of the beam 14 is a U-shaped bracket 16 which includes a base 17 that may be welded to the beam 14. Projecting upwardly from the base 17 is a pair of spaced parallel apertured lugs 18, and a bolt or pin 19 extends between the lugs 18 and is supported thereby.

Pivotally engaging the bolt 19, Figure 5, is a bracket 20, and the bracket 20 is pivotally connected to a boom 21 by means of a pin or bolt and nut assembly 22. The boom 21 may extend from any suitable implement or machine and as for example the boom 21 may extend from a tractor and may be hydraulically operated so that it can be raised, lowered, or shifted around as desired.

A means is provided for maintaining the frame 10 substantially level or horizontal so as to prevent undue strain from being put on the parts, and this stabilizing or leveling means comprises a first pair of springs 23 which extend between the bracket 20 and the side members 12, Figure 1. A spring 24 also extends between the boom 21 and the frame 10, and these springs 23 and 24 serve to return the frame 10 to its normal position in the event it shifts during use.

Arranged adjacent each corner of the frame 10 and arranged in pairs are apertured ears 25. A bolt or pin 26 extends through each pair of apertured ears 25, and a sleeve 27 is circumposed on each bolt 26, Figure 4. A substantially L-shaped tine or fork 28 has one end secured to each of the sleeves 27 in any suitable manner, as for example by welding, and the free end of each of the tines 28 is pointed as at 29 so as to facilitate engagement of the tine or fork with hay or the like. Braces 30 extend from the sleeve 27 through the tine 28 for reinforcing or steadying the tine.

There is further provided for each of the tines 28 a pair of arms 31, and the arms 31 are arranged in pairs and have their lower ends pivotally mounted on the bolt 26. A bolt 32 extends between each pair of arms 31, and the bolt 32 extends through one of a plurality of spaced apertures 33 that are arranged in a pair of superposed tension members 34. The tension members 34 extend between the pair of arms 31. The other ends of the tension members 34 are connected to the tine 28 by means of a bolt and nut assembly 35. Thus, it will be seen that when the arms 31 are swung or shifted, the tines also will be shifted or moved so that hay can be lifted up or moved from place to place as desired.

Extending between the upper ends of arms 31 is a pin or bolt 36 which has a clip 37 connected thereto, and a pulley 38 is carried by two of the clips 37. It will be seen from Figure 1 of the drawings that there are two of the pulleys 38, one for each pair of forks 28. A pair of cables or flexible ropes 41 are provided, and the cables 41 are trained over the pulleys 38. It will be seen from Figure 1 that the pair of cables 41 are arranged in crisscross relation with respect to each other so that they will not rub together and thereby cause undue wear on the cables or ropes. As shown in Figure 2, there is sufficient space between the cables to prevent the cables from rubbing together. The ropes 41 are also arranged in engagement with guide pulleys 39 which are supported by eye-bolts 40, and the cables 41 may extend back to the vicinity of the tractor seat so that they can be readily pulled by the tractor operator.

A means is provided for limiting swinging movement of the forks in one direction, and this means is shown in detail in Figure 3. Thus, there is provided a pair of stop members 42 and 43 for each of the forks 28. The stop members 42 and 43 are interconnected together by a bolt and nut assembly 44, and it will be observed that the upper stop member 42 is wider than the lower stop member 43. The upper stop member is adapted to be engaged by the arms 31 so as to limit swinging movement of the fork assembly. In the event that it is desired that the forks swing back further, then the stop members 42 and 43 can be reversed so that the smaller stop member is above the larger stop member whereby a greater amount of swinging movement of the arms 31 can be brought about. For limiting swinging movement of the forks in the opposite direction, chains 45 extend between the bolts 32 and the frame 10 and are secured thereto. Thus, when the chains 45 are pulled tight or taut, no further downward swinging movement of the forks can be brought about.

Referring to Figure 6 of the drawings there is shown a modified hay lift which includes a rectangular frame 46 that has a beam 48 secured thereto, and secured to the beam 48 is a U-shaped support member 47. A bolt 49 is carried by the support member 47, and a bracket 50 is pivotally connected to the bolt 49. A housing 51 has its lower end pivotally connected to the bracket 50 by means of a bolt and nut assembly 52, and a bar 53 is slidably or telescopically mounted in the housing 51. The bar 53 is provided with a cut-out or opening 54 which is adapted to register with an opening 55 in the housing 51, and a pin 56 is mounted for movement into and out of engagement with the openings 55 and 54. The pin 56 is connected to a link 57 and the link 57 is pivotally connected to the housing 51 by means of a pin 60. A cable 58 is connected to the link 57 for manually pivoting the link, and a coil spring 59 is provided for biasing or urging the link 57 towards the housing 51. The cable 58 may lead to the vicinity of the tractor seat.

Secured to the upper end of the bar 53 is a bolt 61 which has a cable 62 connected thereto, and the cable 62 may be connected to a boom that may be actuated by a tractor or the like. A plurality of chains 63 are also connected to the bolt 61, and the lower ends of the chains 63 are connected to arms 64, the lower ends of the arms 64 being connected to substantially L-shaped forks or tines 65. Levers or braces 66 interconnect the arms 64 and forks 65 together.

The L-shaped tines 65 are pivotally connected to ears 67 by means of a pin or bolt and nut assembly 68.

From the foregoing it is apparent that there has been provided a hay fork or lifting device which will facilitate the lifting or lowering of hay and the like. In use the hay fork can be mounted on a boom such as the boom 21 which may extend from a tractor, and the boom 21 may be actuated in any suitable manner so that it can be raised, lowered, or shifted from side to side as desired. Then, the bolt or pin 22 can be used for connecting the bracket 20 to the end of the boom 21 as shown in the drawings, and then as the boom is raised or lowered or moved, the entire fork assembly will be moved therewith. To actuate the tines 28, it is only necessary to manually pull on the pair of ropes or cables 41 and it will be seen that these cables 41 are arranged in criss-cross relation over the central portion of the frame 10 as shown in Figure 1. There are two pulleys 38 provided, and these pulleys 38 are connected to the outermost fork assemblies 28. Thus, each cable 41 is first trained under one of the guide pulleys 39, and then the cable is trained over one of the pulleys 38 on the outermost fork assembly, and then this cable or rope is tied or otherwise secured to the bolt 36 on the upper end of the innermost pair of arms 31. Thus, it will be seen that by pulling on the ropes 41 all four of the forks 28 will be caused to pivot. Similarly by releasing tension or manual pressure on the cables, the forks 28 will drop from the solid line position shown in Figure 2 to the dotted line position of Figure 2. Thus, hay and the like can be readily raised, lowered, or unloaded. The springs 23 and 24 help maintain the frame in a level position and the chains 45 limit downward swinging movement of the forks 28, while the stop members 42 and 43 limit swinging movement of the forks in the other direction. In Figure 6 the modified fork lift may be suspended by means of the rope or cable 62 from a boom such as the boom 21, and when the fork assembly is lowered into engagement with hay or the like, the rope 58 can be pulled to the position shown in Figure 6 so that the bar 53 will slide all the way down into the housing 51 and then pressure or tension on the rope 58 can be released so that the pin 56 will pass through the registering openings 55 and 54 then the forks 65 will remain in their down position so that the fork assembly can be lifted with a load of hay or the like and when it is desired to discharge or empty the fork assembly, it is only necessary to pull on the cable 58 so that the link 57 will move to the position shown in Figure 6 against the tension of the coil spring 59 whereby the bar 53 will move up and permit the forks 65 to pivot upwardly to the position shown in Figure 6 so that the hay being held thereby will drop out. When the bar 53 is being held down in the housing 51 by means of the pin 56, the forks 65 will hang down due to direction of gravity so that a load of hay can be held thereby.

The frame can be made of channel iron, and the plurality of apertures 33 in the tension members 34 permit an adjustment as to the length of throw of the forks 28 to be effected. The pair of springs 23 keep the forks level while unloading hay, while the spring 24 serves to keep the forks from turning when the ropes are pulled. The fork assembly can be unloaded easily by pulling on the ropes 41 since the two outside forks 28 open first and if the load is above a rack, the full load will be unloaded without the innermost forks 28 being pivoted. The forks are constructed so that the hay rolls out freely and easily. The criss-cross arrangement of the ropes as shown in Figure 1 prevents the ropes from rubbing against each other. Also, the forks 28 can be set so that they will gather in the hay while the device is being lifted and there is no danger of the teeth of the forks being bent since the device is not hydraulically operated. Thus hay can be picked up from the ground. Also, there are no hydraulic cylinders or hoses to attach and the entire assembly can be attached to the boom by means of the one pin or bolt 22 and the boom can be connected to the tractor by means of two pins or bolts. The leveling springs insure that there will be no twist or strain on the boom.

I claim:

1. In a loading device, a rectangular frame including spaced parallel side members and spaced parallel end members, a beam extending between said end members and secured thereto, a support member extending upwardly from said beam and secured thereto and including a pair of spaced parallel apertured lugs, a horizontally disposed bolt supported by said lugs, a bracket pivotally connected to said bolt, apertured ears extending outwardly from each corner of said frame and arranged in pairs and secured to said frame, a pin supported by each of said ears, a sleeve circumposed on each of said pins, a substantially L-shaped fork secured to each of said sleeves and provided with a pointed end, reinforcing braces connected to said sleeves and to said forks, a pair of arms connected to each of said pins, a pair of tension members interconnecting said arms to said forks, a pair of pulleys connected to certain of said arms, and a pair of cables trained over said pulleys in relatively spaced crosswise relation to each other with the ends of the cables fixed to the remainder of said arms.

2. The apparatus as described in claim 1 wherein said tension members are provided with a plurality of spaced apertures whereby said tension members may be selectively connected to said arms, and securing elements extending through said apertures and said arms to secure the arms and tension members in pivoted relation to each other.

3. The apparatus as described in claim 1, and further including coil springs connected to said bracket and the side members of said frame and extending transversely of said frame in parallel relation to said end pieces for maintaining the frame level.

4. The apparatus as described in claim 1, and further including stop members mounted on said frame and engaging said arms to limit backward swinging movement of said forks and chains connected to said tension members and said frames for limiting forward swinging movement of the forks.

References Cited in the file of this patent

UNITED STATES PATENTS

| 2,573,667 | LeTourneau | Oct. 30, 1951 |
| 2,696,926 | Squires et al. | Dec. 14, 1954 |
| 2,754,016 | Anderson | July 10, 1956 |
| 2,759,616 | Weyhausen | Aug. 21, 1956 |

FOREIGN PATENTS

| 163,345 | Great Britain | May 26, 1921 |